(12) United States Patent
Hagihara et al.

(10) Patent No.: US 11,104,277 B2
(45) Date of Patent: Aug. 31, 2021

(54) VEHICLE-MOUNTED DISPLAY DEVICE

(71) Applicant: Honda Motor Co., Ltd., Tokyo (JP)

(72) Inventors: Tomoya Hagihara, Saitama (JP);
Hiroshi Shingu, Saitama (JP); Joji Goto, Saitama (JP); Takayuki Kurihara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 86 days.

(21) Appl. No.: 16/736,822

(22) Filed: Jan. 8, 2020

(65) Prior Publication Data

US 2021/0206326 A1    Jul. 8, 2021

(51) Int. Cl.
*H05K 7/02*    (2006.01)
*H05K 7/04*    (2006.01)
*B60R 11/02*    (2006.01)
*E05F 15/00*    (2015.01)
*B60R 11/00*    (2006.01)
*F16D 11/14*    (2006.01)
*B60J 5/06*    (2006.01)

(52) U.S. Cl.
CPC .......... *B60R 11/0229* (2013.01); *E05F 15/00* (2013.01); *B60J 5/06* (2013.01); *B60R 2011/0021* (2013.01); *B60R 2011/0085* (2013.01); *E05Y 2400/10* (2013.01); *E05Y 2900/531* (2013.01); *F16D 11/14* (2013.01)

(58) Field of Classification Search
USPC ................................. 361/807, 809, 810, 737
See application file for complete search history.

(56) References Cited

U.S. PATENT DOCUMENTS

2006/0232393 A1* 10/2006 Kimura .................. F16H 61/32
340/456
2009/0107048 A1* 4/2009 Nagai ..................... E05B 83/40
49/280

FOREIGN PATENT DOCUMENTS

JP         2018160135        10/2018

* cited by examiner

*Primary Examiner* — Hung S. Bui
(74) *Attorney, Agent, or Firm* — JCIPRNET

(57) ABSTRACT

A vehicle-mounted display device includes a switching mechanism disposed in the slide door and having a support frame on which a display screen is fixed. The support frame is switchable between a display-folded position in which the display screen is folded and a display-unfolded position in which the display screen is unfolded; and a door-open detector that detects whether a door-open command signal indicating that the slide door is going to be opened is received. When the door-open detector receives the door-open command signal, the support frame is switched from the display-unfolded position to the display-folded position, a screen surface or a back surface of the display screen and the inner side of the slide door are facing each other in the left-right direction in the display-folded position, and the display screen is in the display-folded position at least when the slide door is in the door-opened position.

10 Claims, 7 Drawing Sheets

VEHICLE-MOUNTED DISPLAY DEVICE

BACKGROUND OF THE DISCLOSURE

Technical Field

The disclosure relates to a vehicle-mounted display device.

Related Art

When a vehicle is stopped aside a road or parked in a parking lot or the like, when a parked vehicle door is opened, a considerable number of accidents may occur between vehicles, bicycles, motorcycles, pedestrians, etc. The cause of the accident is that it is hard to see the inside of the vehicle from the outside that the door is going to be opened and the lack of attention of passengers in the vehicle. As countermeasures against the above situation, a display device for displaying a view showing a defined area around the vehicle and used for warning the passenger inside the vehicle at the time of getting off is installed in the vehicle. For example, Patent Literature 1 discloses a vehicle including a display device mounted in the vicinity of an inner handle of a door.

LITERATURE OF RELATED ART

Patent Literature

Patent Literature 1: Japanese Laid-Open No. 2018-160135

However, in a case that a display device is mounted on an inner side of a slide door of a vehicle, when the door is opened by a user getting on and off while the display is in a position that is convenient for the user to watch, the display device may come into contact, namely interfere, with the car body, causing the display device damaged. Although it may be considered to stop the opening operation of the door when it is detected that the display device and the car body is in contact, it is still troublesome if the door stops during the opening frequently.

SUMMARY

According to an exemplary embodiment of the disclosure, a vehicle-mounted display device is provided. The vehicle-mounted display is adapted to be installed in an inner side of a slide door of a vehicle in which the slide door is configured to slide along a front-back direction of the vehicle in order to open and close an entrance of the vehicle and adapted to be held in a door-closed position and a door-opened position. The inner side of the slide door and an outer body surface of the vehicle are facing each other in a left-right direction of the vehicle in the door-opened position. The vehicle-mounted display device includes a switching mechanism disposed in the inner side of the slide door and having a support frame on which a display screen is adapted to be fixed, wherein the support frame is switchable between a display-folded position in which the display screen is folded and a display-unfolded position in which the display screen is unfolded; and a door-open detector that detects whether a door-open command signal indicating that the slide door is going to be opened is received. When the door-open detector detects that the door-open command signal is received, the support frame is switched from the display-unfolded position to the display-folded position, a screen surface or a back surface of the display screen and the inner side of the slide door are facing each other in the left-right direction in the display-folded position, and the display screen is in the display-folded position at least when the slide door is in the door-opened position.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DESCRIPTION OF THE EMBODIMENTS

According to an exemplary embodiment of the disclosure, a switching mechanism is provided to move a display device mounted on an inner side of a slide door of a vehicle according to a detected door-open command signal so that the display device does not interfere with any portion of the vehicle during an opening/closing operation of the slide door.

An exemplary embodiment of a vehicle-mounted display device of the disclosure is described below with reference to the drawings. The vehicle-mounted display device is used in a vehicle provided with slide doors.

In the following drawings, in order to make each configuration easy to understand, the scale, the number and the like may be different in each structure and the actual structures.

<Overall Configuration of Vehicle-Mounted Display Device 100>

Figure 1:
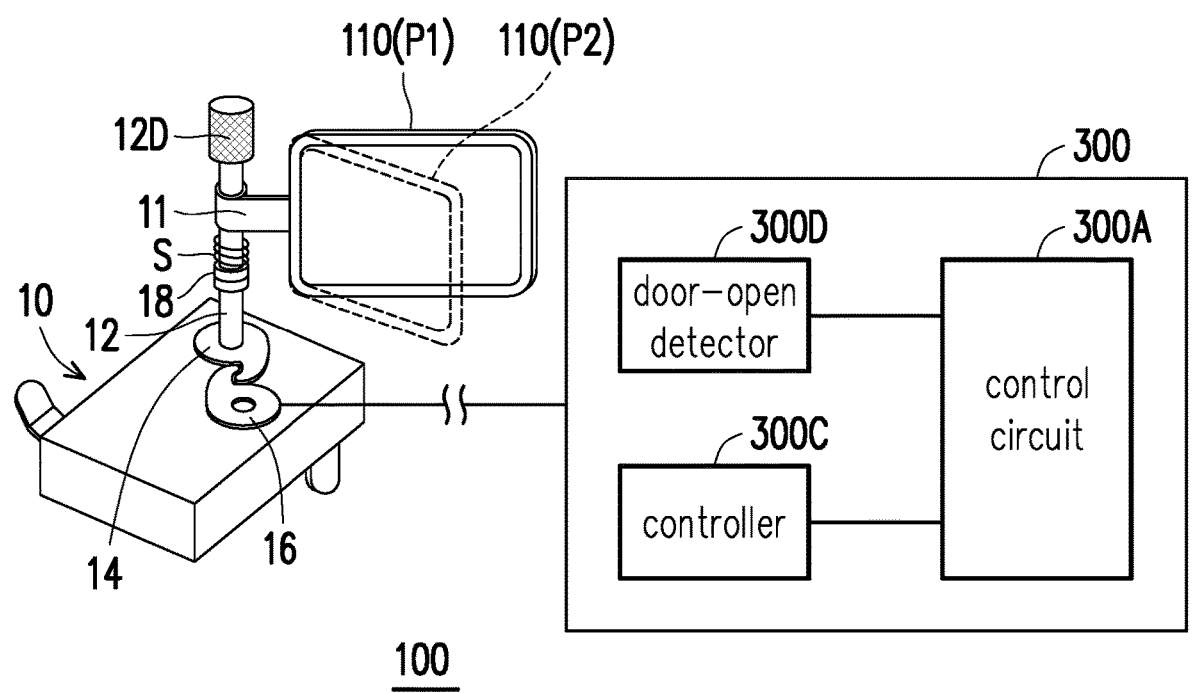
FIG. 1 is a schematic diagram showing a vehicle-mounted display device according to an exemplary embodiment of the disclosure.
Figure 2:
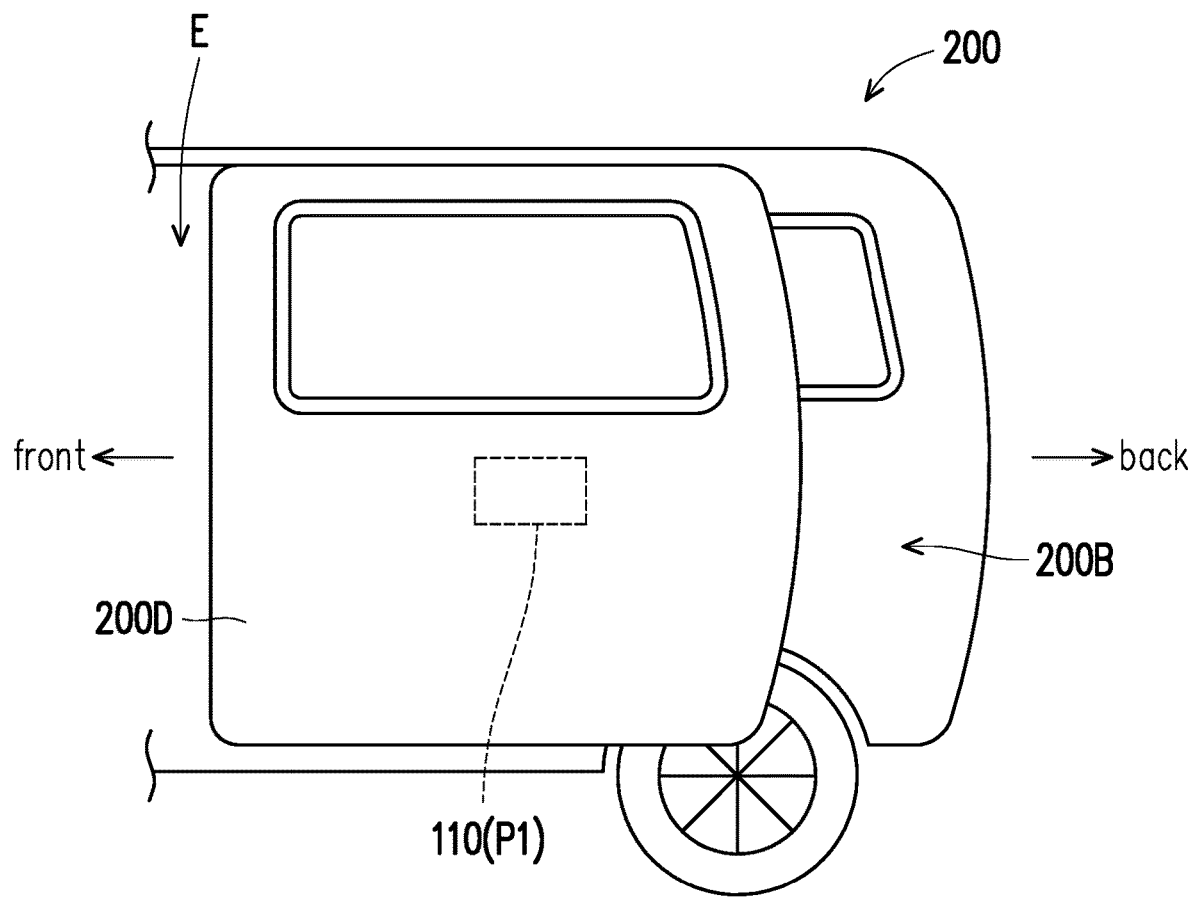
FIG. 2 schematically shows the display screen of the embodiment being in the display-folded position when the slide door is in the door-opened position.
Figure 3A:
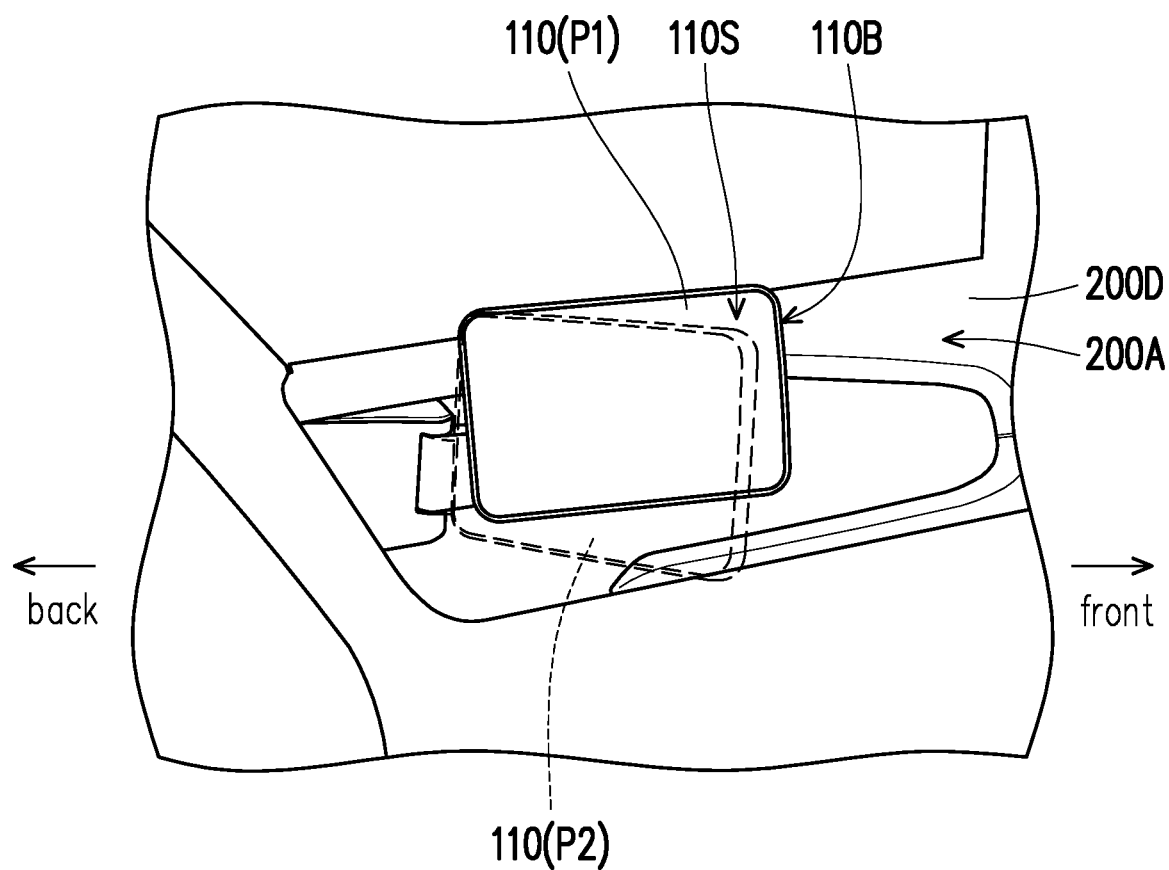
FIG. 3A and FIG. 3B schematically show the display screen is mounted on the support frame of the embodiment in the inner side of the slide door.
Figure 3B:
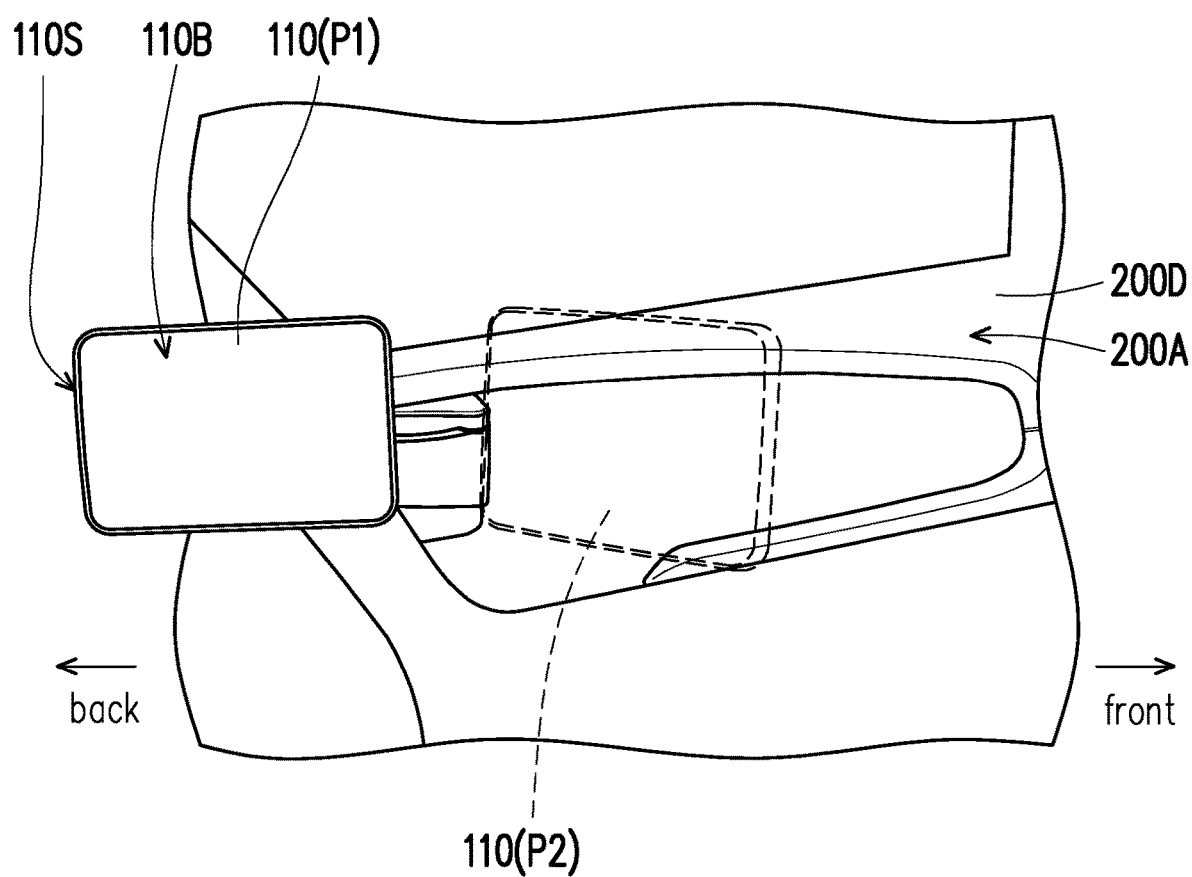

FIG. 1 is a schematic diagram showing a vehicle-mounted display device according to an exemplary embodiment of the disclosure. FIG. 2 schematically shows the display screen of the embodiment being in the display-folded position when the slide door is in the door-opened position. FIG. 3A and FIG. 3B schematically show the display screen is mounted on the support frame of the embodiment in the inner side of the slide door. In the embodiment of the disclosure, the vehicle 200 may be a kind of vehicle provided with slide doors, wherein each of the slide doors 200D is configured to slide along a front-back direction of the vehicle 200 in order to open/close an entrance E of the vehicle 200. The slide door 200D is held in a door-opened position when the slide door 200D is opened and in a door-closed position when the slide door 200D is closed. In the door-opened position, as the slide door 200D is slid along an outer body surface 200B, an inner side 200A of the slide door 200D and the outer body surface 200B of the vehicle 200 are facing each other in a left-right direction of the vehicle 200.

As shown in FIG. 1 to FIG. 3B, the vehicle-mounted display device 100 includes a switching mechanism 10 having a support frame 11, a shaft 12, a latch member 14, a ratchet member 16 and a clutch assembly 18. The vehicle-mounted display device 100 is installed in the inner side 200A of one of the slide doors 200D of the vehicle 200. The vehicle-mounted display device 100 may also be installed in the inner side 200A of each of the slide doors 200D of the vehicle 200. The switching mechanism 10 of the vehicle-mounted display device 100 is installed in the inner side 200A of the slide door 200D to make the display screen 110 mounted on the slide door 200D movable. Herein, the display screen 110 may be a display panel for displaying a view showing a defined area around the vehicle 200 that is used for warning a user or passenger inside the vehicle at the time of the user getting off when the vehicle is stopped or parked. However, the display screen 110 may also be a display panel provided simply for entertainment or displaying telematic information. In addition, the display screen 110 may be a display panel that is embedded in the switching mechanism 10 installed in the slide door 200D of the vehicle 200, or the display screen 110 may also be a display panel that is externally mounted onto the support frame 11 of the switching mechanism 10 installed in the slide door 200D of the vehicle 200.

As shown in FIG. 1, the display screen 110 is fixed on the support frame 11 of the switching mechanism 10. The support frame 11 is driven by the shaft 12 and switchable between a display-folded position P1 and a display-unfolded position P2. As shown in FIG. 2, FIG. 3A and FIG. 3B, the display screen 110 is in the display-folded position P1 when the slide door 200D is opened in the door-opened position, and the display screen 110 may be in the display-folded position P1 or in the display-unfolded position P2 when the slide door 200D is closed in the door-closed position. In the embodiment of the disclosure, the display screen 110 is in the display-folded position P1 at least when the slide door 200D is in the door-opened position. In addition, when the slide door 200D is in the door-closed position, the display screen 110 may be in the display-folded position P1 or in the display-unfolded position P2. Namely, the display screen 110 is only in the display-folded position P1 when the slide door 200D is in the door-opened position, the display screen 110 can be in any of the display-folded position P1 and the display-unfolded position P2 when the slide door 200D is in the door-closed position. As shown in FIG. 3A, the back surface 110B of the display screen 110 and the inner side 200A of the slide door 200D are facing each other in the left-right direction in the display-folded position P1. In another example of the embodiment, as shown in FIG. 3B, the screen surface 110S of the display screen 110 and the inner side 200A of the slide door 200D are facing each other in the left-right direction in the display-folded position P1. Herein, in FIG. 3A, the display-folded position P1 is defined as the screen surface 110S of the display screen 110 and the outer body surface 200B of the vehicle 200 are facing each other in the left-right direction of the vehicle and a clearance exists between the screen surface 110S of the display screen 110 and the outer body surface 200B of the vehicle 200. Alternately, in FIG. 3B, the display-folded position P1 may also be defined as the back surface 110B of the display screen 110 and the outer body surface 200B of the vehicle 200 are facing each other in the left-right direction of the vehicle and a clearance exists between the back surface 110B of the display screen 110 and the outer body surface 200B of the vehicle 200. Therefore, by the configuration of disposing the display screen 110 to be driven by the support frame 11 to be in the display-folded position P1 when the slide door 200D is opened, the display screen 110 does not interfere with any portion of the vehicle 200, thereby it is ensured that the display screen 110 and the body of the vehicle 200 may not be damaged.

In the embodiment, the display screen 110 is driven to be folded or unfolded by the support frame 11 according to a door-open command signal transmitted to the controller 300C of the opening-closing control device 300, wherein the door-open command signal indicates that the slide door 200D is going to be opened. The door-open detector 300D detects whether a door-open command signal is received. For example, the door-open detector 300D is connected to a control circuit 300A that is disposed in an opening-closing control device 300 of the vehicle 200. For example, the opening-closing control device 300 may be a portion of an in-vehicle electronic control unit (ECU) provided in the driving system of the vehicle. When the door-open detector 300D detects that the door-open command signal is received, the support frame 11 is operated to drive the display screen 110 to move from the display-unfolded position P2 to the display-folded position P1.

The shaft 12 that drives the support frame 11 is provided with a latch member 14 at the bottom end 12B of the shaft 12. The latch member 14 is connected to the ratchet member 16 that is disposed in the slide door 200D. Herein, the controller 300C is connected to a control circuit 300A of the opening-closing control device 300 and controls the operation of the ratchet member 16. The controller 300C may also be a control unit that is disposed in the opening-closing control device 300 of the in-vehicle ECU provided in the driving system of the vehicle.

The latch member 14 and the ratchet member 16 are configured to be a latch-ratchet structure in which the latch member 14 and the ratchet member 16 are latched to each other in a latched position PL1 and the latch member 14 and the ratchet member 16 are not latched to each other in an unlatched position PL2. In the embodiment, the latch member 14 and the ratchet member 16 are in the latched position PL1 when the slide door 200D is in the door-closed position, and the latch member 14 and the ratchet member 16 are in the unlatched position PL2 when the slide door 200D is in the door-opened position. The controller 300C may also control the ratchet member 16 to release the latch member 14 when a door-open command signal is received and the slide door 200D is going to be opened. Moreover, the shaft 12 is driven synchronically by the operation of the latch-ratchet structure in the embodiment. For example, the shaft 12 is driven to be in the display-folded position P1 when the latch member 14 and the ratchet member 16 are in unlatched position PL2, and the shaft 12 is driven to be in the display-unfolded position P2 when the latch member 14 and the ratchet member 16 are in the latched position PL1.

Figure 4:
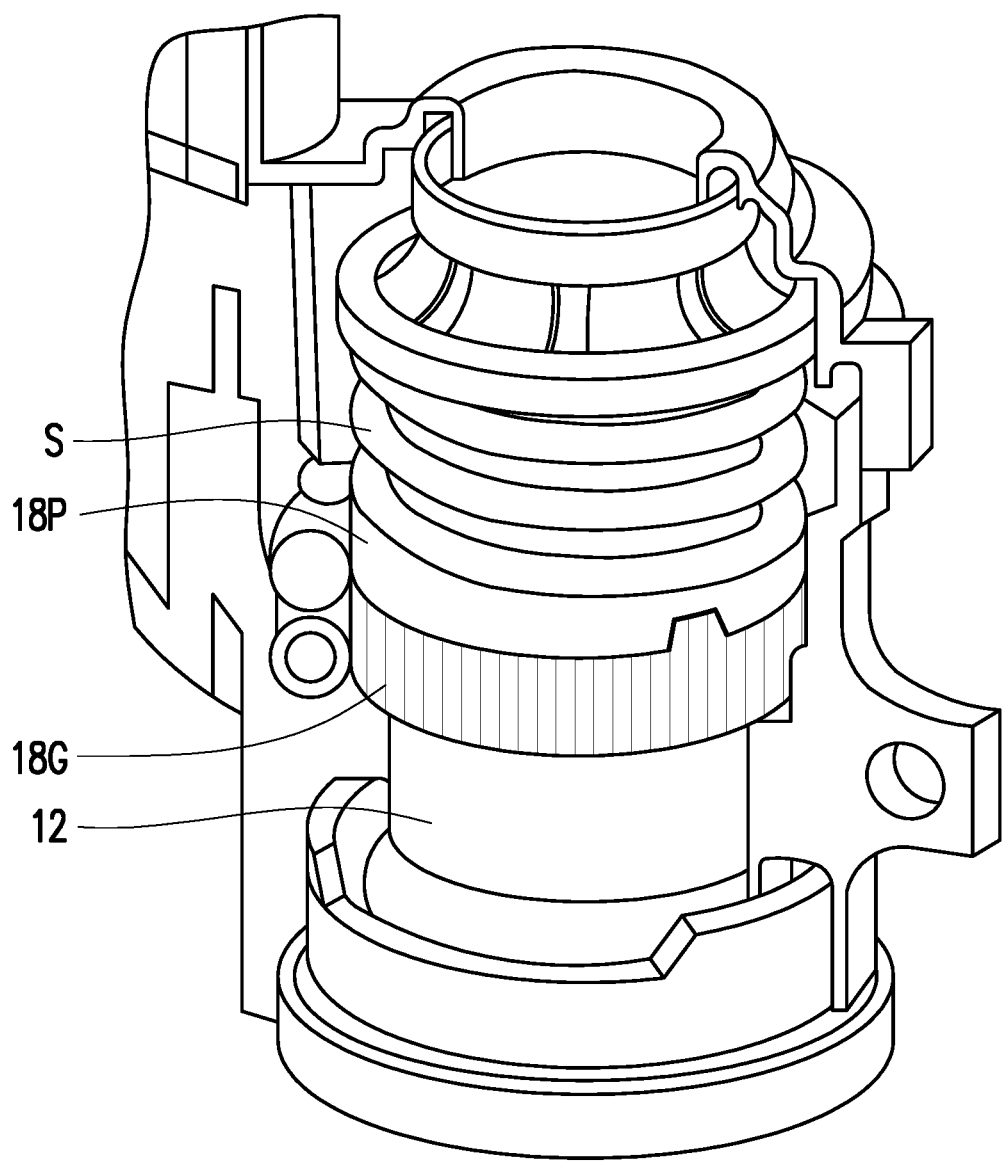
FIG. 4 is a schematic diagram illustrating a portion of the switching mechanism of the embodiment in which the latch member and the ratchet member are omitted for the convenience of description.
Figure 5:
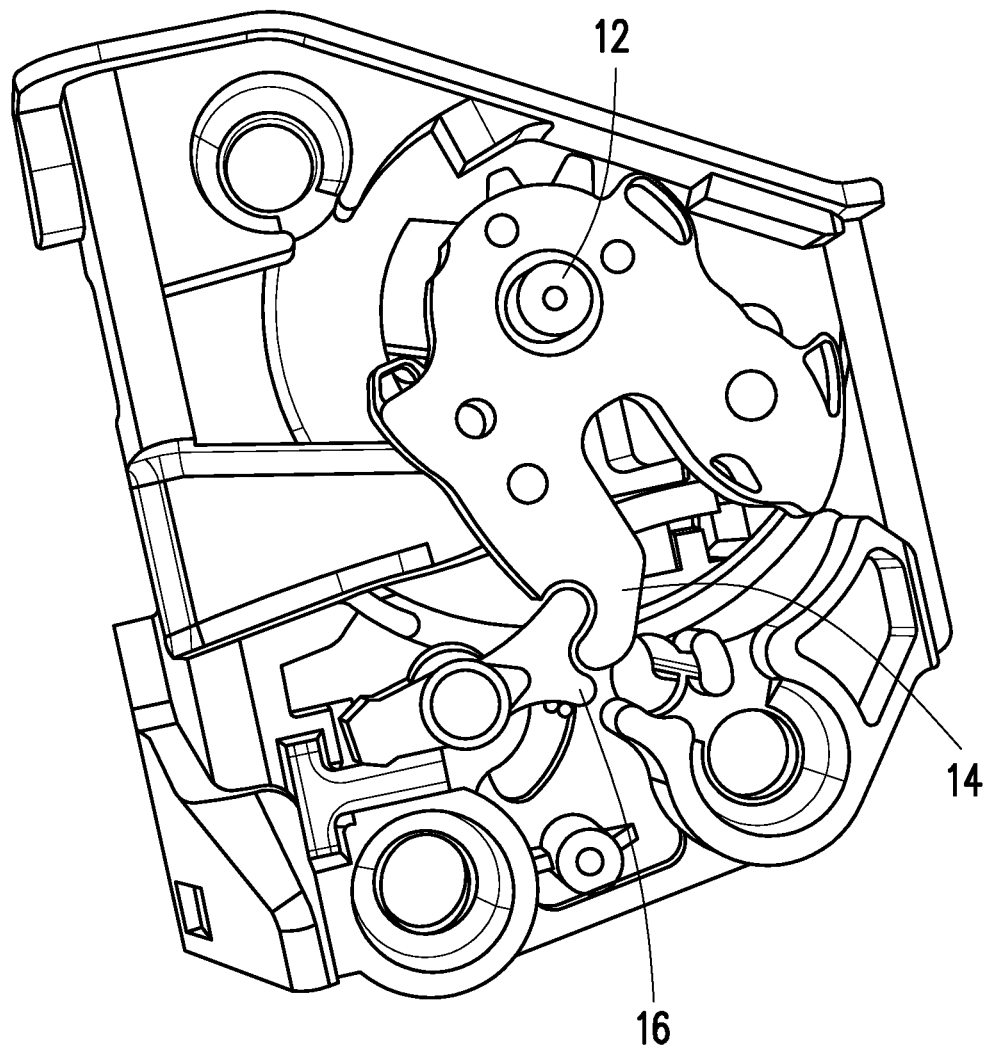
FIG. 5 is a schematic diagram illustrating the latch member and the ratchet member of the switching mechanism of the embodiment.
Figure 6:
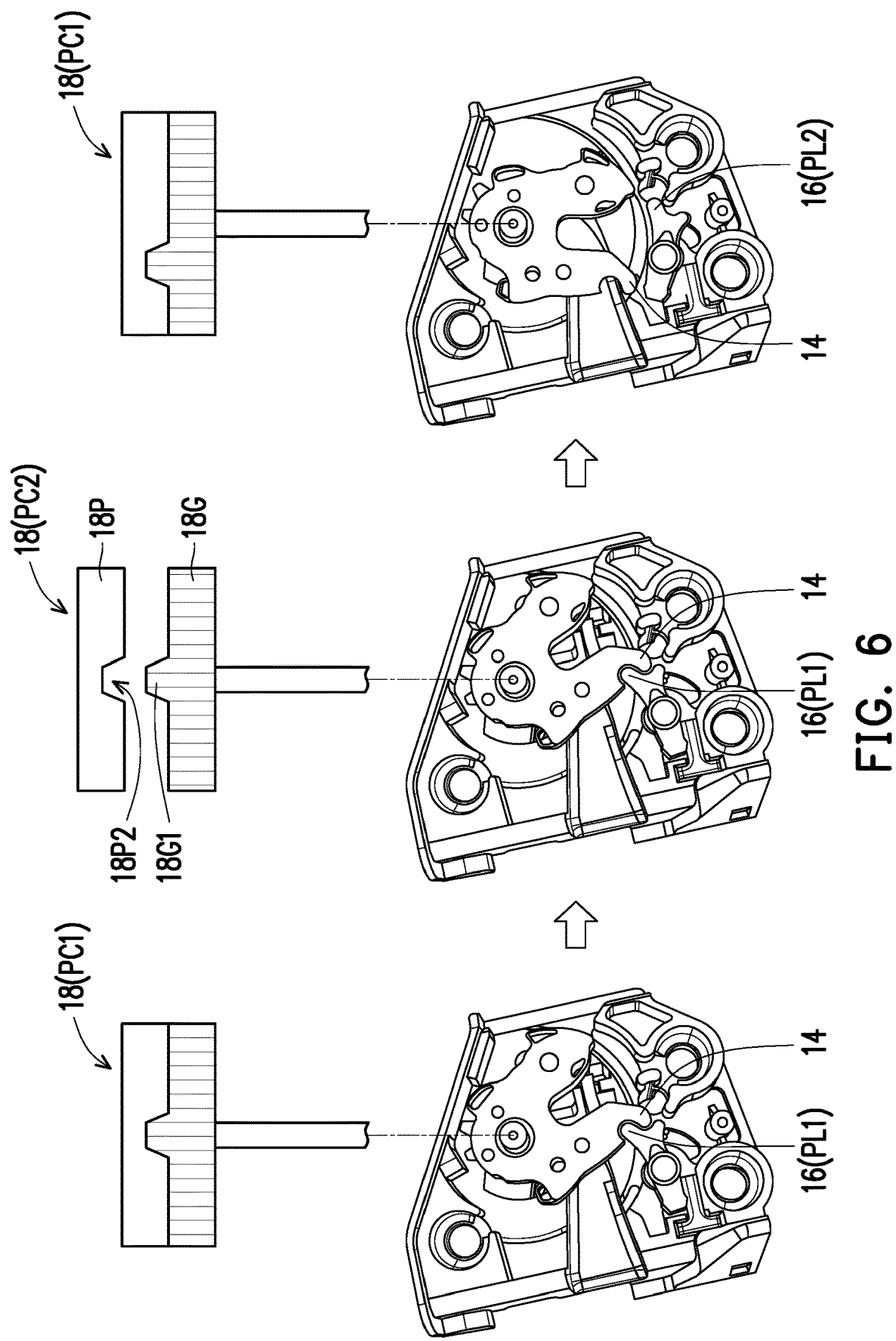
FIG. 6 schematically shows the operations of the clutch assembly, the latch member and the ratchet member according to the exemplary embodiment of the disclosure.

FIG. 4 is a schematic diagram illustrating a portion of the switching mechanism of the embodiment in which the latch member and the ratchet member are omitted for the convenience of description. FIG. 5 is a schematic diagram illustrating the latch member and the ratchet member of the switching mechanism of the embodiment with some portions omitted from the drawing for the convenience of description. FIG. 6 schematically shows the operations of the clutch assembly, the latch member and the ratchet member according to the exemplary embodiment of the disclosure.

A clutch assembly 18 is disposed between the latch member 14 and the shaft 12, so that the shaft 12 may be synchronized with the operation of the latch-ratchet structure. In the embodiment, as shown in FIG. 4 to FIG. 6, the clutch assembly 18 includes a clutch gear 18G and a clutch plate 18P. The clutch gear 18G is disposed to the head end 12H of the shaft 12 and having an engaging portion 18G1 that is formed as a projection on the peripheral of the clutch gear 18G. The clutch plate 18P is disposed between the clutch gear 18G and the latch member 14 via the shaft 12. The clutch plate 18P has an engaged portion 18P2 formed as a recess on the peripheral of the clutch plate 18P. In the embodiment, the engaging portion 18G1 of the clutch gear 18G is engaged with the engaged portion 18P2 of the clutch plate 18P in the engaged position PC1, and the engaging portion 18G1 of the clutch gear 18G is not engaged with the engaged portion 18P2 of the clutch plate 18P in the released position PC2, wherein the clutch plate 18P is allowed to rotate in a particular range about the shaft 12 when the clutch assembly 18 is in the released position PC2. Herein, the engaging portion 18G1 is formed as a projection on the peripheral of the clutch gear 18G while the engaged portion 18P2 is formed as a recess on the peripheral of the clutch plate 18P. Alternately, the engaging portion 18G1 may also be formed as a recess on the peripheral of the clutch gear 18G while the engaged portion 18P2 may be formed as a projection on the peripheral of the clutch plate 18P.

Moreover, a biasing spring S is pivoted between the clutch assembly 18 and the support frame 11, wherein the biasing spring S is used for applying a biasing load that biases the support frame 11 to switch from the display-unfolded position P2 to the display-folded position P1. The biasing spring S is sleeved onto the shaft 12 and located between the clutch plate 18P and the support frame 11. For example, the biasing spring may be a torsion spring in which the torque of the torsion spring is substantially equal to the biasing load that biases the support frame 11 to switch from the display-unfolded position P2 to the display-folded position P1. In addition, the predetermined load that applies to the display screen 110 or to the support frame 11 to switch from the display-folded position P1 to the display-unfolded position P2 is larger than the biasing load of the biasing spring S.

<Operation of Switching Mechanism 10>

In the embodiment, as shown in FIG. 1 and FIG. 6, in a condition of the user existing in the vehicle 200 and the slide door 200D is in the door-closed position when the vehicle is moving or not moving, the display screen 110 is allowed to be in any position of the display-folded position P1, the display-unfolded position P2, and any position in a particular range between the display-folded position P1 and the display-unfolded position P2. Herein, the display screen 110 may be rotated around the support frame 11 by applying a predetermined load in the rotation direction in order to make the display screen 110 rotate from the display-folded position P1 to the display-unfolded position P2. As such, the user is convenient to see the screen surface 110S of the display screen 110.

In the embodiment, the shaft 12 is provided with a damping device 12D as shown in FIG. 1 for driving the display screen 110 to gently rotate around the shaft 12. The damping device 12D may be an oil damper, for example. As such, some minute adjustment of the display screen 110 may be done by the operation of the oil damper so that the user is convenient to see the screen surface 110S.

In the condition as shown in the leftmost schematic view of FIG. 6, the slide door 200D is in the door-closed position, the display screen 110 is in the display-folded position P1, the clutch assembly 18 is in the engaged position PC1, and the latch member 14 and the ratchet member 16 are in the latched position PL1.

Furthermore, in the condition of the slide door 200D being in the door-closed position, as shown in the middle schematic view of FIG. 6, when the predetermined load is applied to the display screen 110 or applied to the support frame 11 so as to rotate the display screen 110 around the shaft 12, the clutch assembly 18 is forced to be in the released position PC2 in which the engagement of the clutch plate 18P and the clutch gear 18G is released because of the applied predetermined load, the display screen 110 may be operated to be in display-unfolded position P2 or in any position within the particular range of the rotation of the clutch assembly 18 around the shaft 12. As such, the user may adjust the angle of the display screen 110 in any position to see the display screen 110 conveniently.

Next, in this condition, when it occurs that the vehicle 200 is stopped/parked and the user is going to be getting off the vehicle, a door-open command signal is transmitted to the controller 300C of the opening-closing control device 300 of the driving system of the vehicle. In this condition, the door-open detector 300D detected that a door-open command signal is received, namely the door is going to be opened, at the time the door-open command signal being received is detected, the clutch assembly 18 has to be in the engaged position PC1 in which the display screen 110 is in the display-folded position P1. Then, in the condition of the slide door 200D still being in the door-closed position and the door-open detector 300D detected that a door-open command signal is received, as shown in the rightmost schematic view of FIG. 6, the latch member 14 and the ratchet member 16 are controlled to be switched from the latched position PL1 to the unlatched position PL2, the shaft 12 is synchronized and driven by the latch member 14 so that the clutch assembly 18 are changed from the released position PC2 to the engaged position PC1 by the biasing load applied by the biasing spring S, and the display screen 110 is switched to be in the display-folded position P1. As such, as the display screen 110 is already stored in the display-folded position P1, the slide door 200D is opened in a manner that the display screen 110 does not interfere with any portion of the outer body surface 200B of the vehicle 200 since there is a clearance between the back surface 110B or the screen surface 110S of the display screen 110 and the outer body surface 200B of the vehicle 200, thereby damage of the display screen 110 and the vehicle body is avoided. In addition, when the slide door 200D is going to be opened and the user is getting off the vehicle, as the display screen 110 has already been stored in the display-folded position P1, the display screen 110 does not get in the way when the user getting off the vehicle.

In light of the foregoing, as illustrated in the embodiment of the disclosure, the vehicle-mounted display device is provided with a switching mechanism in which a display panel is moved to be folded and stored into a secured position so that there may not have any contact between the display panel and the vehicle body, when the slide door of the vehicle is going to be opened according to a door-open command signal and when the slide door is in a door-opened position. Therefore, the display panel may not get in the way when the user is getting off the vehicle, and the display panel and the vehicle body are prevented from collision and damage.

The embodiment and example of the disclosure are described above; however, the disclosure is not limited to the above-described embodiment and can be variously modified and altered within the scope of the gist of the disclosure. The embodiment and the modifications thereof are included in the scope and the gist of the disclosure and are included in the disclosure described in the claims and equivalent scopes thereof.

What is claimed is:

1. A vehicle-mounted display device, adapted to be installed in an inner side of a slide door of a vehicle in which the slide door is configured to slide along a front-back direction of the vehicle in order to open and close an entrance of the vehicle and adapted to be held in a door-closed position and a door-opened position, wherein the inner side of the slide door and an outer body surface of the vehicle are facing each other in a left-right direction of the vehicle in the door-opened position, the vehicle-mounted display device comprising:
   a switching mechanism disposed in the inner side of the slide door and having a support frame on which a display screen is adapted to be fixed, wherein the support frame is switchable between a display-folded position in which the display screen is folded and a display-unfolded position in which the display screen is unfolded; and
   a door-open detector that detects whether a door-open command signal indicating that the slide door is going to be opened is received;
   wherein when the door-open detector detects that the door-open command signal is received, the support frame is switched from the display-unfolded position to the display-folded position,
   a screen surface or a back surface of the display screen and the inner side of the slide door are facing each other in the left-right direction in the display-folded position, and
   the display screen is in the display-folded position at least when the slide door is in the door-opened position.

2. The vehicle-mounted display device according to claim 1, wherein
   when the slide door is in the door-opened position, the back surface or the screen surface of the display screen and the outer body surface of the vehicle are facing each other in the left-right direction and a clearance exists between the back surface or the screen surface of the display screen and the outer body surface of the vehicle.

3. The vehicle-mounted display device according to claim 1, wherein
   when the slide door is in the door-closed position, the display screen is in the display-folded position or in the display-unfolded position.

4. The vehicle-mounted display device according to claim 1, wherein the switching mechanism comprises:
   a shaft that drives the support frame to switch between the display-folded position and the display-unfolded position,
   a latch member connected to a bottom end of the shaft and fixed at a position corresponding to the display-folded position;
   a ratchet member connected to the latch member and pivotally movable between a latched position in which the ratchet member is engaged with the latch member and an unlatched position in which the ratchet member releases the latch member; and
   a controller configured to control an operation of the ratchet member,
   wherein the ratchet member is configured to fix the latch member to be at the position corresponding to the display-folded position,
   when the door-open detector detects that the door-open command signal is received, the controller controls the ratchet member to move from the latched position to the unlatched position.

5. The vehicle-mounted display device according to claim 4, wherein the switching mechanism further comprises:
   a clutch assembly disposed to a head end of the shaft and coupled between the shaft and the support frame;
   wherein the clutch assembly is configured to be in an engaged position by applying a biasing load that biases the support frame to switch from the display-unfolded position to the display-folded position, and
   the clutch assembly is released to be in a released position from the engaged position by applying a predetermined load that is larger than the biasing load.

6. The vehicle-mounted display device according to claim 5, wherein the clutch assembly comprises:
   a clutch gear disposed to the head end of the shaft and having an engaging portion; and
   a clutch plate having an engaged portion corresponding to the engaging portion and connected to the support frame;
   wherein the engaging portion and the engaged portion are engaged in the engaged position and released in the released position of the clutch assembly.

7. The vehicle-mounted display device according to claim 6, wherein
   the engaging portion is a projection formed on the clutch gear, and
   the engaged portion is a recess formed on the clutch plate.

8. The vehicle-mounted display device according to claim 4, wherein
   a biasing spring is used for applying the biasing load and pivoted between the clutch assembly and the support frame.

9. The vehicle-mounted display device according to claim 4, wherein
   when the door-open detector detects that the door-open command signal is received, the support frame is in the display-folded position, the ratchet member is in the unlatched position and the clutch assembly is in the engaged position.

10. The vehicle-mounted display device according to claim 1, wherein
   the controller and the door-open detector are connected to a control circuit of an opening-closing control device of the vehicle.

* * * * *